(12) United States Patent
Billman et al.

(10) Patent No.: US 6,612,524 B2
(45) Date of Patent: Sep. 2, 2003

(54) FOREBODY VORTEX ALLEVIATION DEVICE

(75) Inventors: Garrett M. Billman, Troy, MO (US); Patrick J. O'Neil, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/052,056

(22) Filed: Jan. 17, 2002

(65) Prior Publication Data

US 2003/0132351 A1 Jul. 17, 2003

(51) Int. Cl.$^7$ .............................................. B64C 23/06
(52) U.S. Cl. ...................... 244/199; 244/207; 244/208; 244/204; 244/200; 244/130
(58) Field of Search ................... 244/207–209, 244/130, 204, 199–200

(56) References Cited

U.S. PATENT DOCUMENTS

| | | | | |
|---|---|---|---|---|
| 1,499,064 A | * | 6/1924 | Kuipers | 244/199 |
| 1,767,944 A | * | 6/1930 | Schleusner | 244/200 |
| 1,782,210 A | * | 11/1930 | Nose | 244/209 |
| 2,267,927 A | * | 12/1941 | Kightlinger | 244/200 |
| 2,646,945 A | * | 7/1953 | Perry | 244/209 |
| 2,833,492 A | * | 5/1958 | Fowler | 244/209 |
| 3,128,973 A | * | 4/1964 | Dannenberg | 244/130 |
| 3,604,661 A | * | 9/1971 | Mayer, Jr. | 244/207 |
| 3,794,274 A | * | 2/1974 | Eknes | 244/130 |
| 4,114,836 A | * | 9/1978 | Graham et al. | 244/130 |
| 4,522,360 A | * | 6/1985 | Barnwell et al. | 244/208 |
| 4,666,104 A | * | 5/1987 | Kelber | 244/209 |
| 5,167,387 A | * | 12/1992 | Hartwich | 244/200 |
| 5,366,177 A | * | 11/1994 | DeCoux | 244/209 |
| 5,590,854 A | * | 1/1997 | Shatz | 244/209 |
| 5,806,808 A | * | 9/1998 | O'Neil | 244/208 |
| 5,884,871 A | * | 3/1999 | Fedorov et al. | 244/200 |
| 5,901,929 A | | 5/1999 | Banks et al. | |
| 6,050,523 A | * | 4/2000 | Kraenzien | 244/199 |
| 6,079,671 A | | 6/2000 | O'Neil et al. | |
| 6,302,360 B1 | * | 10/2001 | Ng | 244/199 |

FOREIGN PATENT DOCUMENTS

| GB | 2129748 A | * | 5/1984 | 244/199 |
|---|---|---|---|---|

OTHER PUBLICATIONS

Craig A. Hunter, et al., Advanced Aerodynamic Design of Passive Porosity Control Effectors, 39$^{th}$ AIAA Aerospace Sciences Meeting & Exhibit, Jan. 8–11, 2001/Reno, NV.
Richard M. Wood, et al., Assessment of Passive Porosity with Free and Fixed Separation on a Tangent Ogive Forebody, AIAA–92–4494–CP, Copyright 1992.
Steven X. S. Bauer, et al., Alleviation of Side Force on Tangent–Ogive Forebodies Using Passive Porosity, Journal of Aircraft, vol. 31, No. 2, Mar.–Apr. 1994.

* cited by examiner

Primary Examiner—Michael J. Carone
Assistant Examiner—L. Semunegus
(74) Attorney, Agent, or Firm—David J. Clement

(57) ABSTRACT

A forebody 10 for an aeronautical vehicle 12 is provided. The forebody 10 includes an exterior wall 14 having a first half 16 and a second half 18. The first half 16 has a first porous section 20 and the second half 18 has a second porous section 24. The first half 16 and the second half 18 also have a first exterior side 22 experiencing a first fluidic pressure and a second exterior side 26 experiencing a second fluidic pressure, respectively. A hollow inner cavity 28 is fluidically coupled to the first exterior side 22 and the second exterior side 26 and allows fluid passage between the first exterior side 22 and the second exterior side 26 through the first porous section 20, the inner cavity 28, and the second porous section 24. The exterior wall 14 equalizes the first fluidic pressure with the second fluidic pressure. Additional forebodies and methods for performing the same are also provided.

20 Claims, 4 Drawing Sheets

FOREBODY VORTEX ALLEVIATION DEVICE

TECHNICAL FIELD

The present invention relates generally to vehicle bodies, and more particularly to a method and apparatus for minimizing asymmetric shedding of vortices on a vehicle forebody.

BACKGROUND OF THE INVENTION

Aircraft, missiles, and other aeronautical vehicle have high fineness forebodies that are typically solid bodies having solid surfaces. The forebodies at high angles of attack relative to a flowfield tend to shed their nose vortices asymmetrically. By shedding their nose vortices asymmetrically the fluid pressures on a left side and a right side of a forebody are in a non-equilibrium state. The non-equilibrium state generates an undesirable side force and a yaw moment on the forebody, and therefore on the vehicle.

Typically, in order to alleviate the generated undesired side force and yaw rate, stabilizing fins are utilized. The stabilizing fins are attached to the vehicle in a location aft of the center of gravity of the vehicle. The stabilizing fins offset the generated side forces and yaw moments during maneuvering at higher angles of attack. Since, the surfaces of the stabilizing fins are designed for use during high angle of attack flight, the surfaces are over-designed for forces and moments experienced at lower angles of attack, which is unwarranted.

There are also several disadvantages with using stabilizing fins. The stabilizing fins generate more drag on the vehicle, thereby negatively effecting fuel consumption. The stabilizing fins also inherently increase the cost of producing the vehicle due to increase design, material, and production costs. Another disadvantage is that in utilizing stabilizing fins, electrical, pneumatic, or hydraulic control devices are also frequently required to control the stabilizing fins. The control devices increase costs of the vehicle and fuel consumption by increasing the weight of the vehicle.

Similar disadvantages exist for vehicles utilizing various other surfaces similar to that of the stabilizing fins to account for generated undesirable side forces and yaw rates, and also in controlling direction of travel of the vehicle.

Previous forebodies have been designed incorporating a number of porous cavities and interconnected plenums that are controlled and activated by valves and other devices. These forebodies have been found to have little effect on minimizing asymmetric shedding of vortices. Simply adjusting fluid flow through a plenum does not suffice, as performed in traditional forebodies, in equalization of pressures around the exterior of a forebody. The plenums as well as other devices such as transpirational controllers and vacuum pumps add weight to a forebody, thereby, increased fuel consumption and operating costs of a vehicle.

There is a continuous effort to improve the functionality and cost in use and production of an aeronautical vehicle. Therefore, it would be desirable to provide a method and apparatus for minimizing asymmetric shedding of vortices on a vehicle forebody and at the same time decreasing operating and production costs.

SUMMARY OF THE INVENTION

The foregoing and other advantages are provided by a method and apparatus for minimizing asymmetric shedding of vortices on a vehicle forebody. A forebody for an aeronautical vehicle is provided. The forebody includes an exterior wall having a first half and a second half. The first half has a first porous section and the second half has a second porous section. The first half and the second half also have a first exterior side experiencing a first fluidic pressure and a second exterior side experiencing a second fluidic pressure, respectively. A hollow inner cavity is fluidically coupled to the first exterior side and the second exterior side and allowing fluid passage between the first exterior side and the second exterior side through the first porous section, the inner cavity, and the second porous section. The exterior wall equalizes the first fluidic pressure with the second fluidic pressure. Additional forebodies and methods for performing the same are also provided.

One of several advantages of the present invention is that it provides an apparatus and method for minimizing asymmetric shedding of vortices on a vehicle forebody, thereby minimizing or eliminating the need for stabilizing fins or surfaces and any accompanying controlling systems. The minimization or elimination of stabilizing fins and corresponding control systems decreases the number of vehicle components and weight of the vehicle, therefore decreasing operating and production costs.

Another advantage of the present invention, depending upon the application, is that it eliminates the need for a solid center surface and plenum within a forebody, which further reduces weight of a vehicle, vehicle complexity, and operating and production costs.

Furthermore, the present invention provides versatility in design and use of a forebody by providing multiple embodiments having various porosity levels, sizes, shapes, materials, forms, and other related features.

The present invention itself, together with attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

Figure 1:
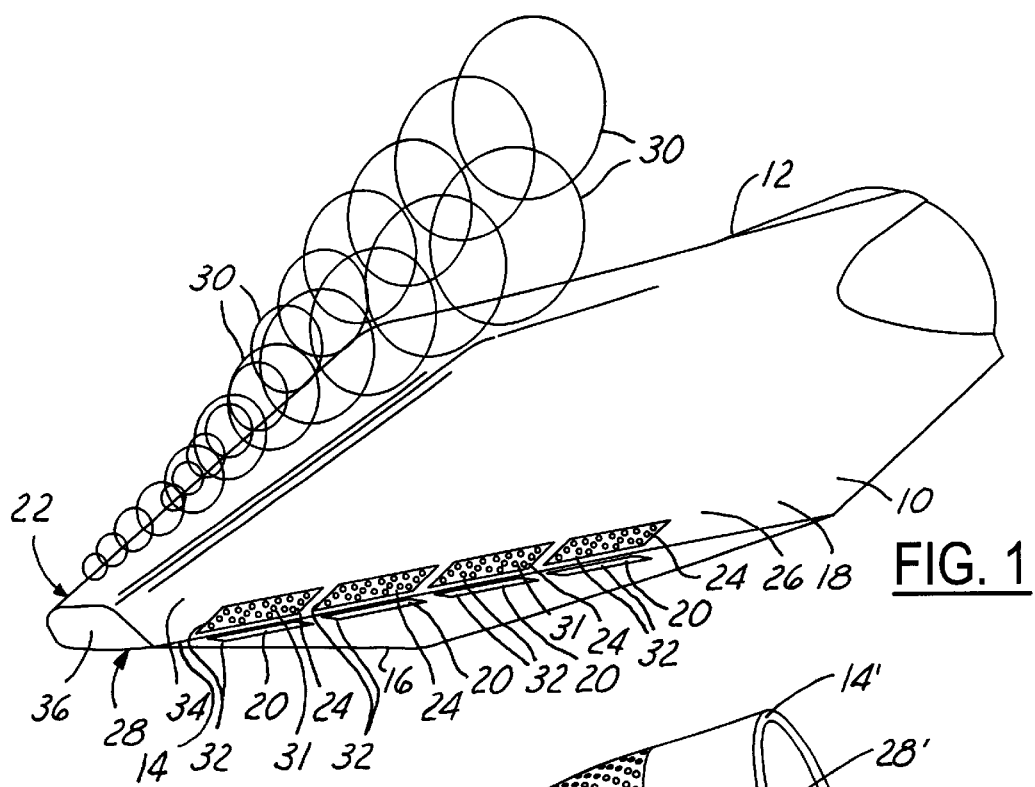
FIG. 1 is a pictorial view of a forebody for an aeronautical vehicle in accordance with an embodiment of the present invention.

In each of the following figures, the same reference numerals are used to refer to the same components. While the present invention is described with respect to a method and apparatus for minimizing asymmetric shedding of vortices on a vehicle forebody, the present invention may be adapted to be used in various systems including: aeronautical vehicle systems, control systems, or other applications requiring the minimization of asymmetric shedding of vortices.

In the following description, various operating parameters and components are described for one constructed embodiment. These specific parameters and components are included as examples and are not meant to be limiting.

Also, in the following description the term "porous" does not refer to the texture of a surface but rather the permeability of a surface, volume, solid, or substance. For example, a forebody may have a porous surface or exterior wall, or a forebody may be formed of a solid material that in it self is porous. A forebody may also have varying degrees of porosity.

Additionally, although the application is described with respect to an aeronautical vehicle operating in air, the present invention may be applied to forebodies of vehicles operating in other fluids. For example a fluid may be in the form of a liquid rather than air.

Referring now to FIG. 1, a pictorial view of a forebody 10 for an aeronautical vehicle 12 in accordance with an embodiment of the present invention is shown. The forebody 10 has an exterior wall 14 that includes a first half 16 and a second half 18. The first half 16 and the second half 18 have a first porous section 20 on a first exterior side 22 and a second porous section 24 on a second exterior side 26, respectively. The first half 16 and the second half 18 during operation of the vehicle 12 experience a first fluidic pressure and a second fluidic pressure, respectively. The forebody 10 also includes a hollow inner cavity 28, which allows fluid to pass between the first porous section 20 and the second porous section 22. The allowance of fluid passage through the forebody 10 equalizes the first fluidic pressure with the second fluidic pressure. The equalization of fluid pressures on the exterior sides 22 and 26 minimizes asymmetric shedding of vortices 30 on the forebody 10. The forebody 10 may optionally also include one or more fluid adjusting panels 32 mechanically coupled to the forebody 10 and adjusting the amount of fluid passage between the first exterior side 22 and the second exterior side 26.

The exterior wall 14 may be of various size, shape, and thickness and formed using methods known in the art. Exterior wall 14 may be formed from various materials including: steel, aluminum, magnesium, copper, brass, carbon fiber, ceramic, resin, titanium, or other materials known in the art.

The first half 16 and the second half 18 are arbitrarily chosen for illustrative purposes, the first half 16 and the second half 18 may refer to any side, slant, surface, or portion of the exterior wall 14. Also the first half 16 and the second half 18 are not necessarily proportionate or symmetric in size or shape.

The first porous section 20 and the second porous section 24 may also be of various size and shape. Porous sections 20 and 24 may have multiple individual porous sections or may be incorporated into a single porous section. The porous sections 20 and 24 have multiple holes 31, which may also have varying size, shape, and dimension.

The inner cavity 28 is unobstructed so as to allow unhindered passage of fluid between porous sections 20 and 24. The inner cavity 28 does not contain a solid inner member or a plenum, as with a traditional forebody, which controls fluid pressures in and out of a forebody. The inner cavity 28 therefore allows for natural pressure adjustments without active control.

The panels 32 may be mechanically coupled to an exterior side 34 of the forebody 10 or to an interior side 36 of the forebody 10. In controlling the porosity of the forebody 10 the panels 32 are preferably coupled to the interior side 36 for increased effectiveness. The panels 32 may be of various size, shape, and formed of various materials some of which mentioned above. The panels 32 may be mechanically or electrically controlled using methods known in the art.

Figure 2:
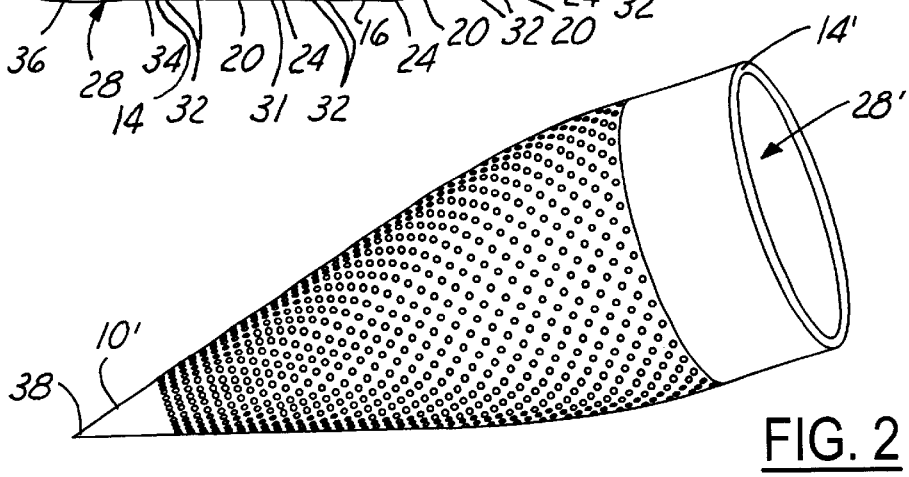
FIG. 2 is a pictorial view of another forebody for an aeronautical vehicle in accordance with another embodiment of the present invention.
Figure 3:
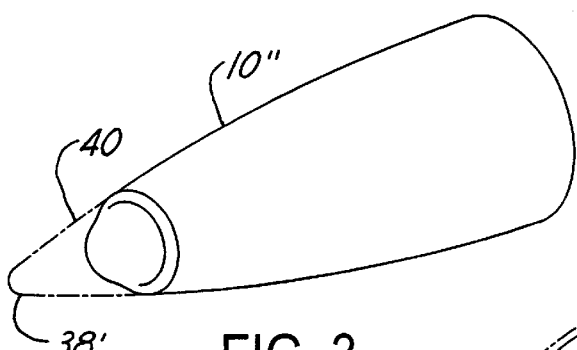
FIG. 3 is a pictorial view of another forebody for an aeronautical vehicle having conical porous volume in accordance with another embodiment of the present invention.
Figure 4:
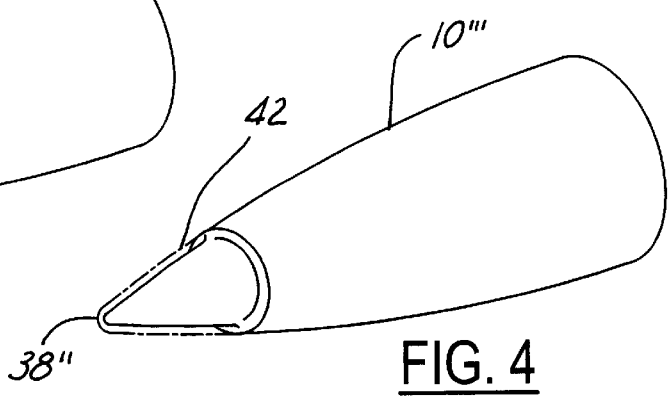
FIG. 4 is a pictorial view of another forebody for an aeronautical vehicle having a conical porous surface region in accordance with another embodiment of the present invention.
Figure 5:
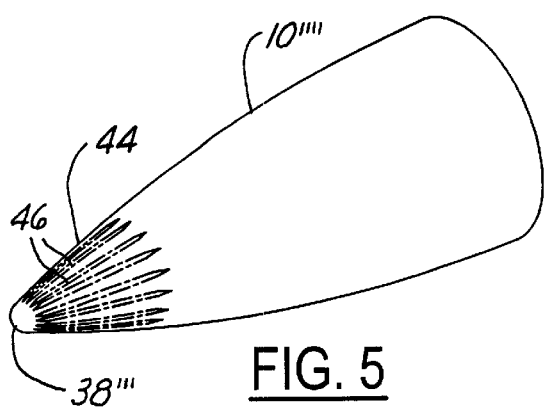
FIG. 5 is a pictorial view of another forebody for an aeronautical vehicle having a longitudinal porous region in accordance with another embodiment of the present invention.
Figure 6:
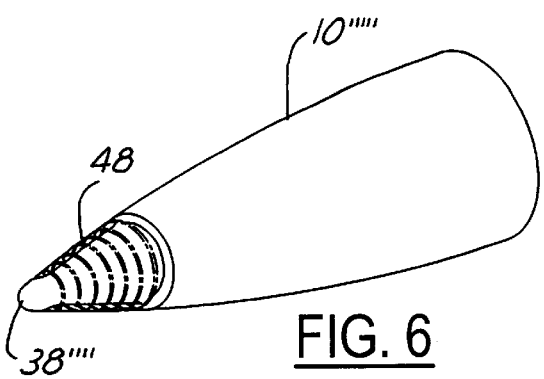
FIG. 6 is a pictorial view of another forebody for an aeronautical vehicle having a radial porous region in accordance with another embodiment of the present invention.

Referring now to FIGS. 2–6, illustrations of various other example forebody embodiments of the present invention are shown. The following forebodies have varying porosities. In FIG. 2, a conical shaped forebody 10' is shown, having a leading point 38, where a majority of the exterior wall 14' is porous. In FIG. 3, a forebody 10" having a conical volume region 40 is shown. In FIG. 4, a forebody 10'" having a conical porous surface region 42 is shown. In FIG. 5, a forebody 10"" having a longitudinal region 44 with porous slices 46, is shown. In FIG. 6, a forebody 10'"" having a radial region 48 is shown. As is apparent from the above illustrations many different forebodies may be formed using the techniques and principles encompassed by the present invention to satisfy various different applications.

Figure 7:
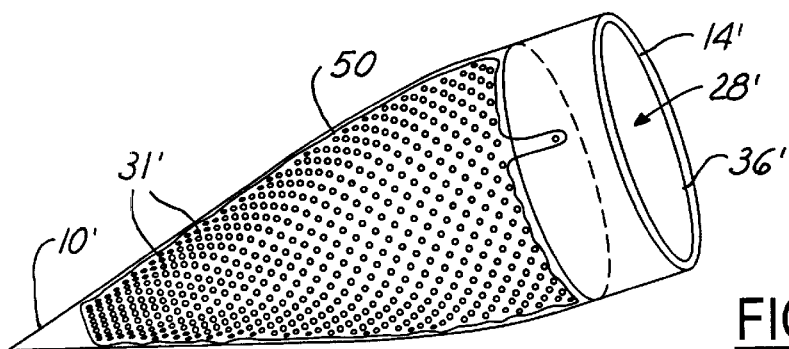
FIG. 7 is a pictorial view of the forebody of FIG. 2 utilizing a bladder in accordance with another embodiment of the present invention.

Referring now to FIG. 7, the forebody 10' is shown incorporating a bladder 50 within a hollow inner cavity 28'. The bladder 50 is used to adjust the amount of fluid passing between a first exterior side 16' and a second exterior side 18' of the exterior wall 14'. As the bladder 50 expands, an inner side 36' exhibits pressure from the bladder 50, which in turn blocks holes 31' in the exterior wall 14' and prevents passage of fluid. As the bladder 50 contracts, the inner cavity 28' becomes unobstructed and fluid is free to pass. The bladder 50 may be formed from various materials and operated to expand and contract using methods known in the art.

Figure 8:
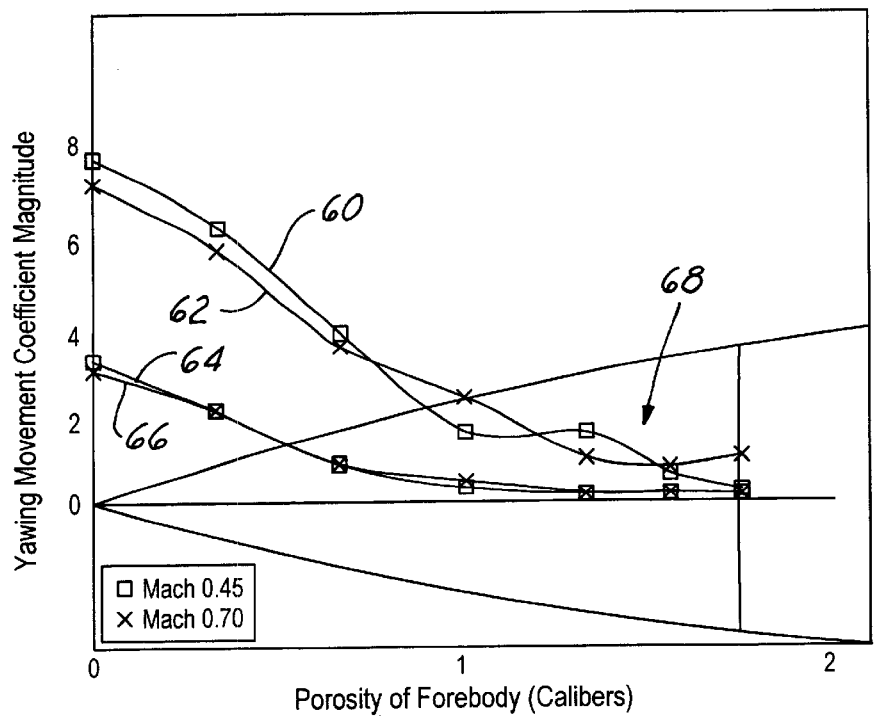
FIG. 8 is a graph illustrating yawing moment coefficient magnitude versus porosity level for a forebody according to an embodiment of the present invention.

Referring now to FIG. 8, a graph illustrating yawing moment coefficient magnitude versus extent of porosity length along the forebody 10' according to an embodiment of the present invention, is shown. Curves 60 and 62 represent peak yawing moment coefficient magnitude values for a forebody 10' traveling at Mach 0.45 and 0.70, respectively. Curves 64 and 66 represent average yawing moment coefficient magnitude values for the forebody 10' traveling at Mach 0.45 and 0.70, respectively. For both the peak values and the average values, as the length of porosity increases, the yawing moment coefficient magnitude values decrease and eventually plateau near zero. A porosity level of approximately 10–20% is preferred. This data is for 20% porosity. A porosity level below 10% decreases the effectiveness of the forebody 10'. Porosity levels above 20% do not necessarily provide any increased benefit in minimizing asymmetric shedding of vortices around the forebody 10', and can adversely affect other performance parameters.

Figure 9:
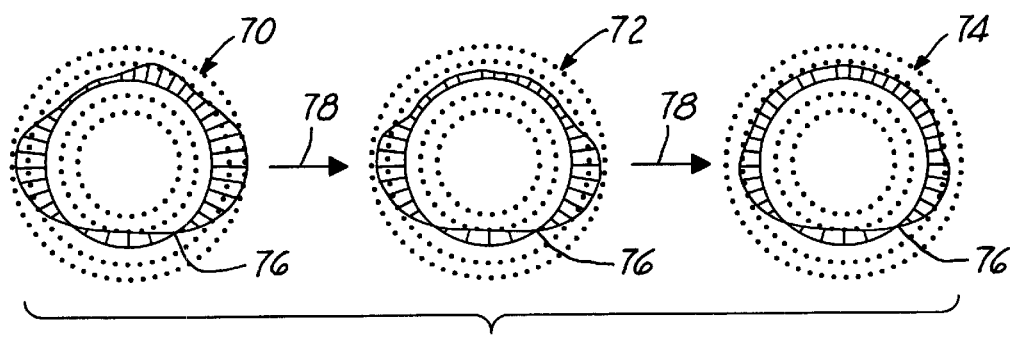
FIG. 9 is a graphical flow diagram illustrating variation in pressure coefficients around a portion of a forebody with increasing porosity levels according to an embodiment of the present invention.

Referring now to FIG. 9, a graphical flow diagram illustrating variation in pressure coefficients around a portion of the forebody 10' with increasing lengths of porous forebody according to an embodiment of the present invention, is shown. Three pressure coefficient plots 70, 72, and 74 are shown for porous forebodies of length 0 cal, 1 cal, and 1.75 cal, respectively. The circle 76 represents an outer cross-sectional circumference of the forebody 10' at a distance 2 cal behind a leading point 38 of the forebody 10'. As the length of the porous section of the forbody increases, represented by arrows 78, the peak pressures exhibited around the forebody 10' decrease and the distribution of the pressures becomes more equalized and uniform. Similar results on pressure are exhibited at other outer cross-sectional circumferences of the forebody 10'.

Figure 10:
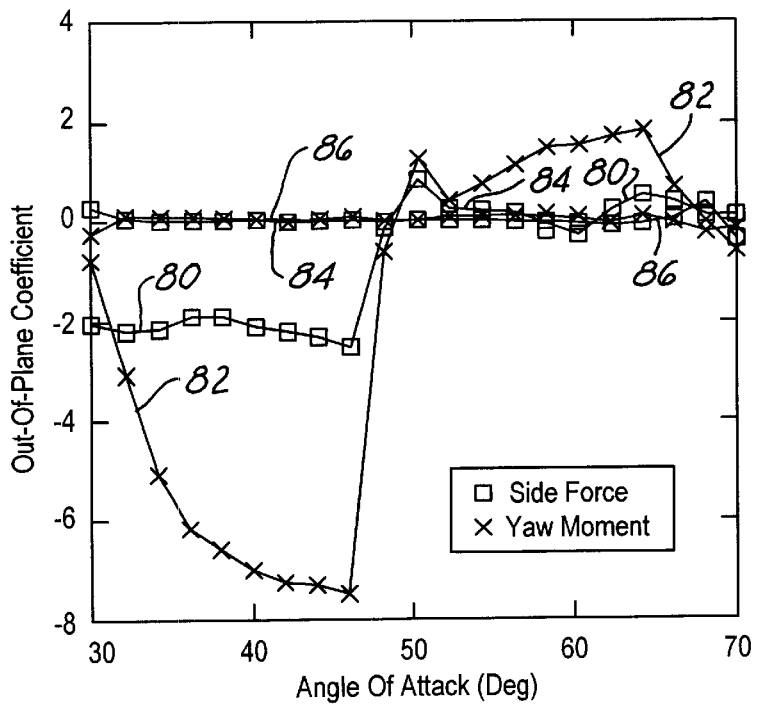
FIG. 10 is a graph illustrating side forces and yaw moments of out-of-plane coefficients versus angles of attack according to an embodiment of the present invention.

Referring now to FIG. 10, a graph illustrating side forces and yaw moments (out-of-plane coefficients) versus angles of attack according to an embodiment of the present invention, is shown. Curves 80 and 82 represent side force and yaw moment of the forebody 10' having approximately 0 cal length porosity, or in other words no porosity. Curves 84 and 86 represent side force and yaw moment of the forebody 10' having 1.75 cal length porosity. The curves 80, 82, 84, and 86 illustrate that an increase in length of porosity for a given forebody, decreases out-of-plane coefficient values for angles of attack between 30θ and 70θ.

Figure 11:
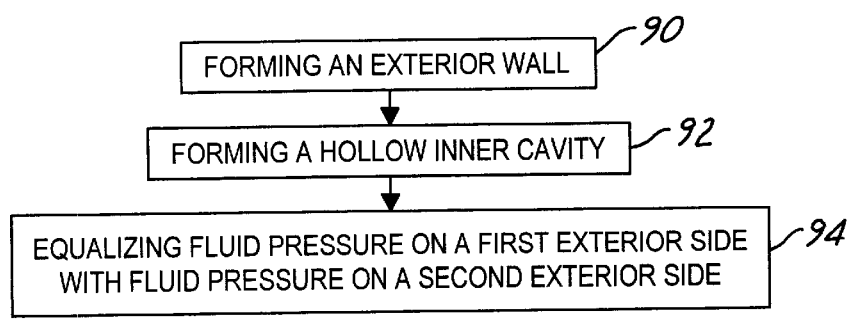
FIG. 11 is a logic flow diagram illustrating a method of minimizing asymmetric shedding of vortices on a vehicle forebody in accordance with another embodiment of the present invention.

Referring now to FIGS. 11, a method of minimizing asymmetric shedding of vortices on a vehicle forebody in accordance with another embodiment of the present invention is shown.

In step 90, the exterior wall 14 is formed. The exterior wall 14 is formed having the first porous section 20 and the second porous section 24.

In step 92, the inner cavity 28 is formed within the exterior wall 14. The inner cavity 28 does not have a solid inner member or plenum as with traditional forebodies.

In step 94, fluid pressure on the first exterior side 22 is equalized with fluid pressure on the second exterior side 26. Fluid is allowed to pass between the first exterior side 22 and the second exterior side 26 through the inner cavity 28.

Figure 12:
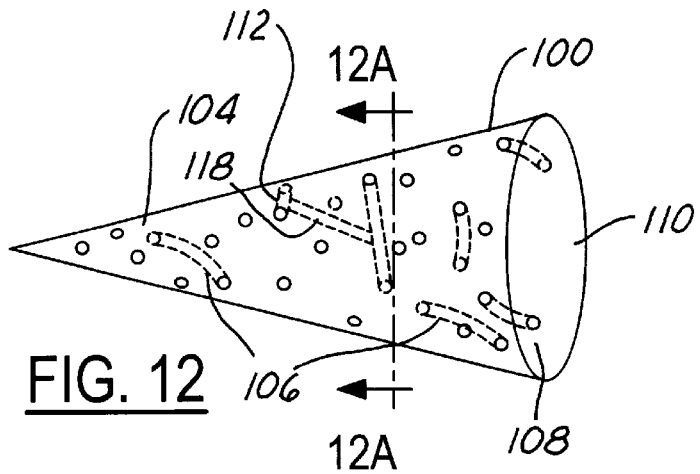
FIG. 12 is a pictorial view of a forebody having a solid body in accordance with an embodiment of the present invention.
Figure 12A:
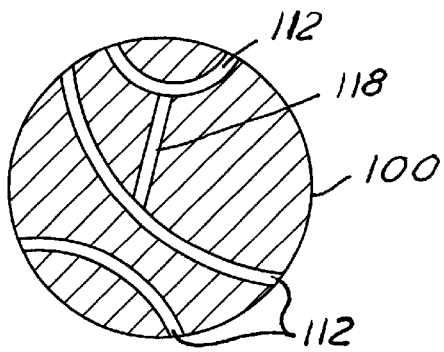
FIG. 12A is a cross-sectional view of the forebody in FIG. 12 in accordance with an embodiment of the present invention.
Figure 13:
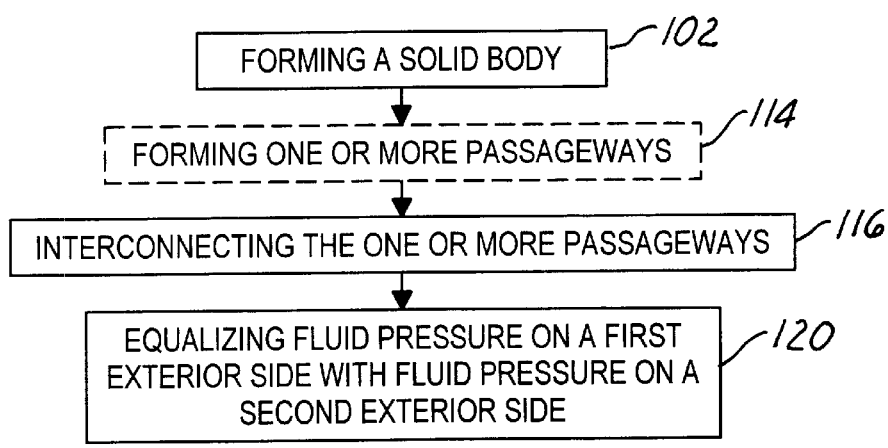
FIG. 13 is a logic flow diagram illustrating a method of minimizing asymmetric shedding of vortices on a vehicle forebody in accordance with an embodiment of the present invention.

Referring now to FIGS. 12, 12A, and 13, an apparatus and method of minimizing asymmetric shedding of vortices on a vehicle forebody 100 in accordance with another embodiment of the present invention are shown.

In step 102, a solid body 104 may be formed from a porous material as briefly described above. The solid body 104 may naturally contain one or more passageways 106 for fluid to pass between a first exterior side 108 and a second exterior side 110 through the forebody 100. The passageways 106 may contain various routes 112 for fluid to pass between the first exterior side 108 and the second exterior side 110. The solid body 104 may be formed of the following materials ceramic material, metal foam, ceramic foam, or ceramic sphere matrix material, or other materials having similar relevant properties known in the art.

In step 114, when a material is used that is not naturally porous, the passageways 106 may be formed within the solid body 104 using machining or molding methods known in the art. The passageways 106 may be formed simultaneously with step 102 or may be formed after performing step 102.

In step 116, the passageways 106 may be interconnected to create additional routes 118 for the fluid to pass between the first exterior side 108 and the second exterior side 110.

In step 120 as with step 94, fluid pressure is equalized on the first exterior side 108 with fluid pressure on the second exterior side 110.

The present invention by equalizing pressure around the exterior of a forebody minimizes asymmetric shedding of vortices on the forebody. The minimization of asymmetric shedding of vortices eliminates the need for stabilizing fins or surfaces and any accompanying controlling systems. The present invention further simplifies forebody components by eliminating the need for a solid inner member and plenum. The above stated advantages of the present invention, allows the present invention to be lighter in weight and have fewer components, thereby decreasing fuel consumption, operating costs, and production costs of a vehicle.

The above-described apparatus, to one skilled in the art, is capable of being adapted for various purposes and is not limited to the following systems: aeronautical vehicle systems, control systems, or other applications requiring the minimization of asymmetric shedding of vortices. The above-described invention may also be varied without deviating from the spirit and scope of the invention as contemplated by the following claims.

What is claimed is:

1. A forebody for an aeronautical vehicle comprising:
   an exterior wall comprising;
      a first half comprising;
         a first porous section; and
         a first exterior side experiencing a first fluidic pressure; and
      a second half comprising;
         a second porous section; and
         a second exterior side experiencing a second fluidic pressure; and
   a hollow inner cavity fluidically coupled to said first exterior side and said second exterior side and allowing fluid passage between said first exterior side and said second exterior side through said first porous section, said hollow inner cavity, and said second porous section;
   said exterior wall equalizing said first fluidic pressure with said second fluidic pressure.

2. A forebody as in claim 1 wherein said exterior wall is conical in shape.

3. A forebody as in claim 1 wherein said exterior wall is produced from at least one of the following materials: steel, aluminum, magnesium, copper, brass, carbon fiber, ceramic, resin, or titanium.

4. A forebody as in claim 1 wherein surface area of said first porous section and said second porous section is approximately equal to 10 to 20 percent of an exterior surface area of said exterior wall.

5. A forebody as in claim 1 wherein said first porous section and said second porous section form at least one of the following regions: a longitudinal region, a radial region, a conical volume region, or a conical porous surface region.

6. A forebody as in claim 1 wherein said hollow inner cavity is unobstructed.

7. A forebody as in claim 1 further comprising a bladder within said hollow inner cavity, said bladder adjusting the amount of fluid passing between said first exterior side and said second exterior side.

8. A forebody as in claim 1 further comprising one or more fluid adjusting panels mechanically coupled to the forebody and adjusting the amount of fluid passage between said first exterior side and said second exterior side.

9. A forebody for an aeronautical vehicle comprising:
   a solid body comprising;
      a first half comprising;
         a first porous section; and
         a first exterior side experiencing a first fluidic pressure; and
      a second half comprising;
         a second porous section; and
         a second exterior side experiencing a second fluidic pressure; and
      one or more passageways fluidically coupled to said first exterior side and said second exterior side, said one or more passageways forming one or more routes and allowing transfer of fluid between said first exterior side and said second exterior side through said first porous section and said second porous section;
   said solid body equalizing said first fluidic pressure with said second fluidic pressure.

10. A forebody as in claim 9 wherein said solid body is naturally porous.

11. A forebody as in claim 9 wherein said one or more passageways are formed within said solid body.

12. A forebody as in claim 9 wherein said porous solid body is produced from at least one of the following materials: ceramic material, metal foam, ceramic foam, or ceramic sphere matrix material.

13. A forebody as in claim 9 wherein said surface area of said first porous section and said second porous section is approximately equal to 10 to 20 percent of an exterior surface area of said solid body.

14. A forebody as in claim 9 wherein said one or more passageways are interconnected to create additional routes for said fluid to pass between said first exterior side and said second exterior side.

15. A forebody as in claim 9 wherein said first porous section and said second porous section form at least one of the following regions: a longitudinal region, a radial region, a conical volume region, or a conical porous surface region.

16. A method of minimizing asymmetric shedding of vortices on a vehicle forebody comprising:
   forming a first porous section and a second porous section on an exterior wall;
   forming a hollow inner cavity; and
   equalizing fluid pressure on said first exterior side with fluid pressure on said second exterior side.

17. A method as in claim 16 wherein equalizing fluid pressure comprises allowing passage of fluid between a first exterior side and a second exterior side of said exterior wall.

18. A method of minimizing asymmetric shedding of vortices on a vehicle forebody comprising:
   forming a solid body;
   forming one or more passageways in said solid body to create routes for a fluid to pass; and
   equalizing fluid pressure on a first exterior side of said solid body with fluid pressure on a second exterior side of said solid body.

19. A method as in claim 18 wherein equalizing fluid pressure comprises allowing passage of fluid between said first exterior side and said second exterior side through said solid body.

20. A method as in claim 18 further comprising interconnecting said one or more passageways to create additional routes for said fluid to pass between said first exterior side and said second exterior side.

* * * * *